Aug. 15, 1967  E. WAMBOLD  3,335,845

CONVEYOR

Filed July 12, 1965

Inventor:
Erwin Wambold

By: Spencer & Kaye
Attorneys

United States Patent Office 3,335,845
Patented Aug. 15, 1967

3,335,845
CONVEYOR
Erwin Wambold, Gross Gerau, Germany, assignor to Licentia Patent-Verwaltungs-G.m.b.H., Theodor-Stern-Kai, Frankfurt, Germany
Filed July 12, 1965, Ser. No. 471,233
8 Claims. (Cl. 198—220)

The present invention relates generally to the conveyor art and, more particularly, to a vibrating conveyor for fine-grained and pulverized material.

When conveying such material on conventional vibrating conveyors, which are driven with reciprocating movements such as unbalanced or electromagnetic drives, an undesired surging or puffing occurs which causes dust eruptions to be formed over the material being conveyed and frequently the conveying process practically comes to a halt.

It is, therefore, an object of this invention to provide an improved vibrating conveyor.

Another object is to provide for the transporting of material, which is particularly difficult to transport, by using conventional vibrating conveyors and additional but simple measures.

It is a further object to provide a conveyor for pulverized material which conveyor has a flexible member carrying the material.

Another object is to provide a vibrating conveyor in which the pulverized material is conveyed in a compressed as distinguished from a dispersed condition.

These objects and others ancillary thereto are accomplished in accordance with the preferred embodiments of the invention by providing a conventional vibrating conveyor with a flexible insert or liner that at times vibrates in a different manner from the conveyor itself.

It is conventional to provide vibrating conveyors with flexible inserts that carry the material. However, these inserts are tube-like, and compressed air introduced into the tube causes the surface which carries the material to change and become curved thereby to loosen the material which sticks to its surface. According to the present invention, an improvement in the conveyance characteristics of pulverized material is obtained by providing a flexible insert for the conveyor which insert is co-extensive with part of the conveyor and during operation, the pulsating formation of subatmospheric pressure between the material and the insert is reduced.

During the conveying process, the conveyor, which vibrates at a speed which is a multiple of the acceleration of gravity, functions in such a way that the insert which lies on the conveyor rises together with the conveyor and thereby the conveyor acceleration is transmitted to the material on the insert. However, when the conveyor vibrates downwardly, the flexible member is raised from the conveyor by the cushion of air between it and the conveyor, due to holes in the walls of the conveyor, and hence vibrates downwardly slower than the conveyor. Thus, the conveyed pulverized material is compressed or compacted and can be conveyed more easily than if it were dispersed and contained a high percentage of air.

Additional objects and advantages of the present invention will become apparent upon consideration of the following description when taken in conjunction with the accompanying drawings in which.

Figure 1:
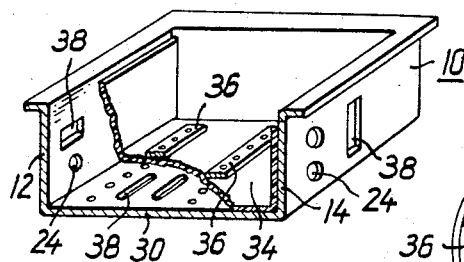
FIGURE 1 is a fragmentary perspective view, with parts broken away for clarity, of one embodiment of the present invention.

Referring now to the drawings wherein like reference characters designate like parts throughout the several views, there is shown in FIGURE 1 a conveyor chute 10 which is provided with an elastic or flexible insert or liner 34 co-extensive with its sides 12 and 14 and bottom 30. The insert, which may be rubber, polyvinylchloride, or similar material, is attached to the bottom of the chute by means of support members 36. These are the sole points of attachment of the insert 34 to the chute 10, the remainder of the insert lying loosely in the chute and hence able to follow the pulsating vibrations of the material being conveyed. Hence, the material is not lifted from the insert but glides over the surface of insert 34 when the conveyor chute 10 vibrates. The walls 12 and 14 and the bottom 30 are provided with openings 24 and slots 38 while the bottom has lots 38. By means of the openings 24 and slots 38, air is introduced to the space between chute 10 and insert 34 on downward vibration of the chute to thereby raise the insert. This results in a dampening of the downward motion of the pulverized material upon vibration of the chute and hence tends to compact the material as it is being conveyed.

Figure 2:
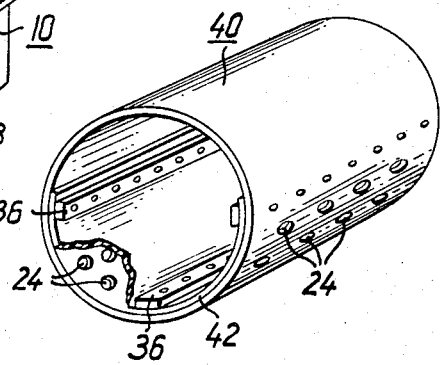
FIGURE 2 is a perspective view of a tubular embodiment with parts broken away for clarity.

FIGURE 2 discloses another embodiment of the invention wherein a tube 40 is used for conveying or transporting the pulverized material. Tube 40 is provided with openings 24 on its lower half and with a flexible or elastic insert or liner 42 which is attached to tube 40 at supports 36. This embodiment functions in a manner similar to that illustrated in FIGURE 1.

It can thus be seen that according to the present invention, a divice is provided which includes a vibrating conveyor having a flexible insert or liner and which is particularly useful for the transporting of fine-grained and pulverized material. The liner extends over at least a portion of the conveyor and during operation, there is a reduction of the pulsating formation of subatmospheric pressure between the material and the liner. In order to accomplish this, the walls of the conveyor may be provided with perforations.

As a further feature of the invention, the conveyor can be provided with elastic walls and/or elastic elements extending lengthwise.

The liners can be arranged to be mounted separately from the conveyor or can be elastically connected with it.

It will be understood that the above description of the present invention is susceptible to various modifications, changes, and adaptations, and the same are intended to be comprehended within the meaning and range of equivalents of the appended claims.

What is claimed is:

1. Apparatus for conveying a pulverized material comprising a vibrating conveyor chute, a flexible insert co-extensive with the bottom of said conveyor chute and means for retarding the downward movement of the insert with respect to the bottom of the conveyor chute on the downward vibratory stroke thereof to cushion the vibration of said flexible insert.

2. Apparatus as defined in claim 1 wherein said last means comprises openings in the bottom of the chute.

3. Apparatus for conveying a pulverized material comprising a vibrating conveyor chute, a flexible insert within said chute lining its bottom and sides, and means for admitting air between said chute and said insert for retarding the downward movement of the insert with respect to the bottom of the conveyor chute on the downward vibratory stroke thereof to cushion the vibration of said flexible insert.

4. Apparatus as defined in claim 3 wherein said insert lies flat along the bottom and sides of said chute.

5. Apparatus for conveying a pulverized material, comprising, in combination:

a vibrating conveyor chute having openings therethrough at least in the bottom thereof; and a one piece air impermeable insert disposed in said chute and extending at least over the entire bottom of said chute to prevent the entry of air from below to the material to be conveyed, said openings permitting the entry of air through the bottom of said conveyor chute for retarding the downward movement of the insert with respect to the bottom of the conveyor chute on the downward vibratory stroke thereof to cushion the vibration of said flexible insert.

6. Apparatus as defined in claim 5 wherein said insert also extends over the side walls of said chute, and said chute has openings through its side walls.

7. Apparatus as defined in claim 6 wherein said insert is a sheet-like member.

8. Apparatus as defined in claim 6 wherein the chute is provided with flexible members extending lengthwise.

References Cited
UNITED STATES PATENTS 3,087,602  4/1963  Hinkle _____ 198—220
3,195,713  7/1965  Morris.

EVON C. BLUNK, *Primary Examiner.*

RICHARD E. AEGERTER, *Assistant Examiner.*